March 28, 1939.  R. B. MILLARD  2,151,863
VAPOR-LIQUID SEPARATOR
Filed June 15, 1937
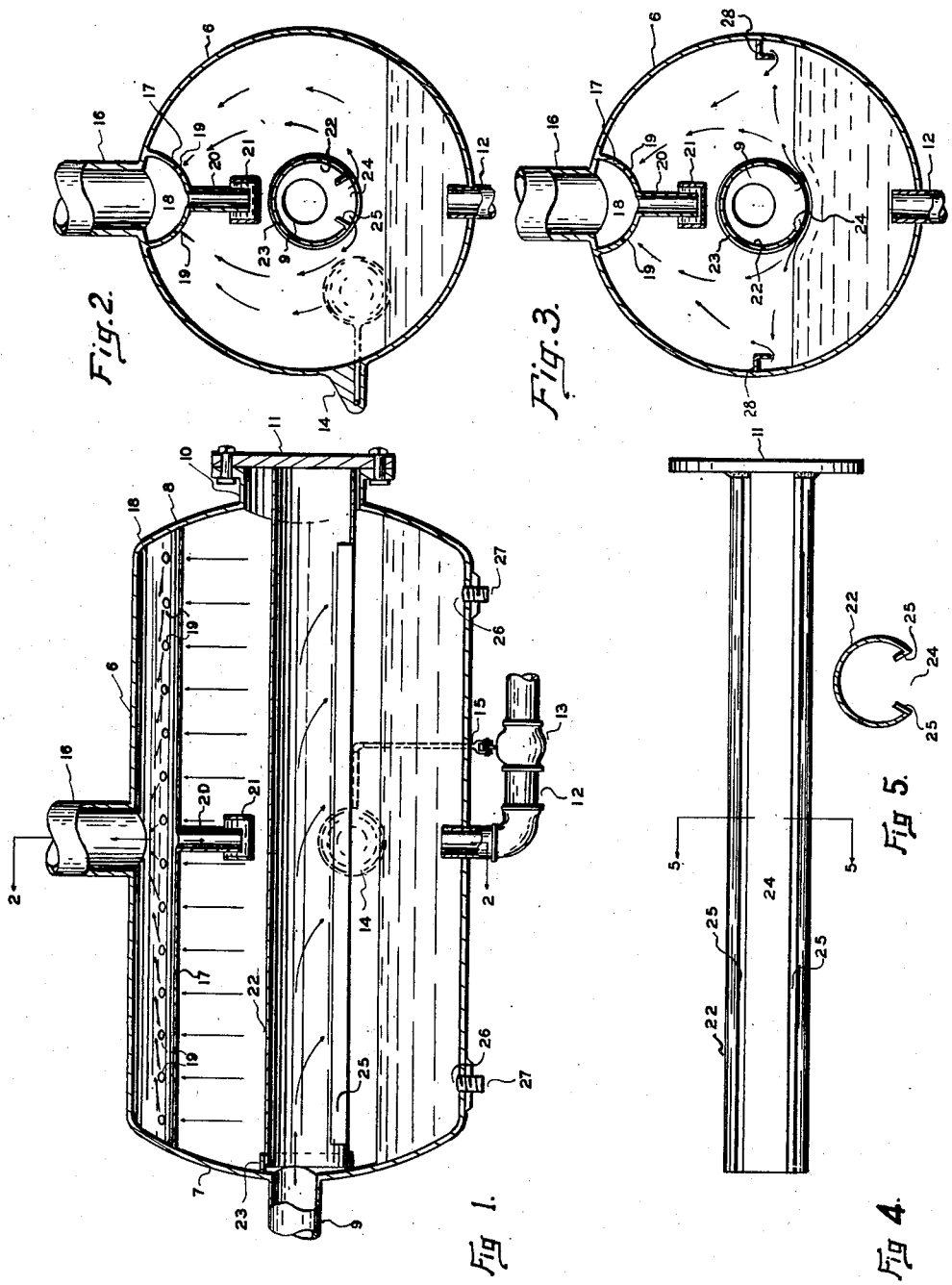
INVENTOR
Raymond B. Millard.
By Barry & Cyr
ATTORNEYS.

Patented Mar. 28, 1939

2,151,863

UNITED STATES PATENT OFFICE 2,151,863

VAPOR-LIQUID SEPARATOR

Raymond B. Millard, Tulsa, Okla.

Application June 15, 1937, Serial No. 148,391

4 Claims. (Cl. 183—2.7)

This invention relates to vapor-liquid separators and particularly to horizontally arranged separators.

It is a primary object of this invention to provide a separator for use particularly in connection with oil wells to effectively separate gas from oil discharged from the wells.

Another object is to provide a separator which will be relatively simple in construction, and which may be relatively low in cost.

A further object is to provide a form of structure which may be used as a scrubber for removing particles of liquids and solids from vapors.

A particular object is to provide a horizontal liquid-vapor separator having a relatively large free area wherein the mass velocity of the vapors may be greatly reduced whereby the vapor will drop the entrained particles of liquid more completely and emerge from the separator relatively free of liquid.

Other objects and advantages of this invention will become apparent from the following detailed description in conjunction with the accompanying drawing which illustrates a form of apparatus in accordance with this invention.

In the drawing:

Fig. 1 is a longitudinal sectional elevation of a separator in accordance with this invention.

Fig. 2 is a transverse section taken along line 2—2 of Fig. 1.

Fig. 3 is a view similar to Fig. 2 showing the changes in the arrangement of Fig. 2, when the separator functions as a scrubber.

Fig. 4 is a detail of the primary separating element of the apparatus, removed from the assembly and viewed from its underside.

Fig. 5 is a section taken along line 5—5 of Fig. 4.

Referring to the drawing, the apparatus of this invention comprises a horizontal cylindrical tank 6 having bumped heads 7 and 8, and constructed of steel or other metal adapted to withstand relatively high internal pressures. An inlet pipe 9 communicates with the interior of tank 6 through head 7 in which pipe 9 is centrally mounted. Opposite pipe 9, and mounted in head 8 is a relatively large manhole 10, closed by a cover plate 11. Connected into the bottom of tank 6, between the ends thereof, is a liquid discharge pipe 12 which extends for a short distance into the interior of the tank and is in open communication therewith. A valve 13 is mounted in pipe 12 and is adapted for operation by a conventional liquid level controller 14 which is mounted on one side of tank 6 and has an operating lever 15 which operatively connects controller 14 to valve 13. Opposite pipe 12 and mounted in the top of tank 6 between the ends thereof, is a vapor discharge pipe 16 which is in open communication with the interior of tank 6.

A curved plate 17, extends longitudinally through the upper portion of the interior of tank 6, and the sides of plate 17, which turn upward, are connected to the interior of tank 6 on opposite sides of pipe 16. The ends of plate 17 are connected to heads 7 and 8, respectively. The sides and ends of plates 17 are generally welded to the walls of tank 6 and heads 7 and 8 to form a liquid and gas tight connection therewith. By virtue of the curvature of plate 17 and the manner of its connection to tank 6, a chamber 18 is provided between plate 17 and interior wall of tank 6 and chamber 18 forms a conduit extending the full length of tank 6. A series of perforations 19 are provided in plate 17 and place chamber 18 in communication with the interior of the main portion of tank 6.

A down spout 20 communicating with chamber 18 is connected to plate 17 and extends downwardly therefrom into the interior of tank 6. A cap 21 is positioned at the lower end of spout 20 and when filled with liquid during the operation of the apparatus serves as liquid seal chamber for the lower end of pipe 20.

A cylindrical primary separator conduit 22 extends longitudinally through the center of the interior of tank 6 and one end thereof is rigidly connected to cover plate 11 which forms a closure therefor. The opposite end of conduit 22 aligns with the inner end of pipe 9 and is supported from the inner wall of head 7 by a sleeve 23. A slot 24 is provided in the bottom of conduit 22 and extends the entire length thereof providing a passageway from the interior of conduit 22 into the interior of tank 6. Marginal lips 25 line the edges of slot 24 and extend inwardly of conduit 22 from the edges of slot 24.

Conduit 22 is mounted in tank 6 eccentrically with respect to the longitudinal axis thereof, so that conduit 22 is somewhat off center with respect to the longitudinal axis of tank 6. By this arrangement, inlet pipe 9, which is of smaller diameter than conduit 22, will register with the upper portion of the interior of conduit 22 rather than with the center thereof.

Drain openings 26 closed by plugs 27 are provided in the bottom of tank 6 for draining therefrom any sand or other mechanical impurities and liquid gathering below the level of the inner end of pipe 12.

The apparatus above described is operated in the following manner:

A stream of liquid and vapor, such as oil and gas from oil wells, carrying sand or other mechanical impurities, if present, is admitted through pipe 9 into conduit 22, which partially confines the stream while reducing its velocity as the stream travels there through toward the rear of the conduit.

The reduction in velocity of the stream traveling through conduit 22 produces a primary separation by permitting the vapor to separate from the liquid and entrained matter. The liquid drops through slot 24 and any mechanical impurities carried thereby settle by gravity to the bottom of the tank to be drawn off eventually through drain openings 26. By means of liquid level controller 14, a level of liquid is maintained in the tank which is somewhat below slot 24.

The vapor separating from the liquid in conduit 22 will pass from slot 24, through the uniform orifice area between the lower edges of marginal lips 25 and the surface of the oil. The inturned lips will serve also as baffles to knock out some of the liquid carried by the gas and also to catch liquid which may flow along the inner surface of conduit 22.

Through the horizontal arrangement of the separator and the maintenance of a liquid level therein a relatively large surface area of liquid is provided, upon which the stream of liquid and vapor, passing from conduit 22, impinges and such liquid is very effective in removing the heavy mist of liquid which will be carried by the vapor.

The vapor now carrying only a relatively fine mist of liquid, will flow horizontally along the surface of the liquid below slot 24 and thence upward along the sides of conduit 22 and will enter the relatively large free area in tank 6 above the level of liquid. In entering this large free area the velocity of the vapors is further reduced and by designing this area to provide a mass velocity of the vapor below its critical point, the fine liquid mist carried by the vapors will separate therefrom and collect in the body of liquid in the lower portion of the tank. The density of both vapor and liquid and the distance between the liquid surface and the vapor outlet will govern the area required for removal of the droplets of liquid from the rising vapor.

The vapor rising through the upper portion of tank 6 flows through orifices 19 in plate 17 and thence through space 18 into pipe 16, through which the vapor is finally discharged from the separator. By causing the vapor to pass through the series of orifices 19, in leaving the separator, short-circuiting of the vapors is prevented while forcing them to become distributed throughout the length of the separator. Orifices 19 are so calculated as to area and spacing that an equal velocity of vapors is provided throughout the entire length of the separator. This feature prevents channeling of the vapor and insures the full active use of the superficial area of the same.

By suitable operation of liquid level controller 14, liquid is discharged from tank 6 through pipe 12 and valve 13 at a rate to maintain a predetermined level of liquid in the vessel and to also provide a more or less constant vapor discharge area between the surface of the liquid and the inturned edges of conduit 22.

Fig. 3 illustrates the slight changes in design and operation of the separator of this invention when utilized as a liquid contact scrubber for removing particles of liquid and mechanical matter from a gas.

In this modification marginal lips 25 are eliminated from conduit 22 and a level of scrubbing liquid is carried in tank 6 which is above the edges of slot 24. The gas to be scrubbed will enter through pipe 9 but in discharging through slot 24 will be forced to bubble through the liquid which seals the edges of slot 24, thereby producing the liquid-vapor contact desirable for scrubbing the gas. The vapor leaving the liquid and flowing upward through the free area of the tank will lose velocity and drop entrained liquid in the same manner as described above in connection with operation as a separator.

Where surges of vapor occur and are of such degree as to cause the vapor to carry liquid through orifices 19, such liquid as will drop out in space 18, will be returned to the main body of liquid through down spout 20, the lower end of which is liquid sealed by liquid in cap 21 to prevent short-circuiting by vapor traveling upwards through spout 20.

The separator, above described, is particularly advantageous when used in connection with oil wells from which a stream of gas and oil frequently carrying sand, is produced, under high pressure. In this case, the high velocity stream discharges horizontally through pipe 9 under the top of conduit 22, which has sufficient length and area to dissipate the kinetic energy of the stream, thereby preventing excessive erosion by the stream, as the greater part of the liquid and mechanical impurities will, almost immediately, fall through the relatively large opening provided by slot 24 upon a cushion of liquid.

Considering a vessel of given dimensions and weight, the horizontal design has a much greater superficial area than the vertical. For comparison take a 4 foot by 8 foot tank, the area of the vertical vessel is 12.56 square feet while the horizontal vessel has nearly 36 square feet. Therefore with identical operating conditions, and accepting the low mass velocity principle of separation, my horizontal design should have a vapor capacity of three times that of conventional vertical designs. Obviously my construction will be cheaper even without taking into consideration the great economy and simplicity of the interior mechanism. Fewer sizes will have to be carried in stock as within certain limits more capacity can be obtained by simply lengthening the vessel.

The surface of liquid exposed to its vapor is three or more times greater than that provided by vertical construction. This feature is of special value where vapors are readily soluble in their liquids and where more time is required to effect a release of vapors held in solution. Obviously the greater exposed surface of liquid in my separator is advantageous.

Greater volume of liquid is also permissible in the horizontal vessel. This added capacity accommodates surges of liquid, permits more even action of the liquid level controller and gives a greater quiet area for the settling of sand, scale or water.

In this design there are few baffles, no mist extractors or other mechanical devices to wear and obstruct the flow and to build up a back pressure. By avoiding abrupt directional changes of vapors and liquids and also restrictions, this design has special advantages where for instance, vacuum operation requires the least possible pressure drop through the apparatus.

The interior mechanism of the separator may be easily and quickly removed without disturbing any of the connections. When the primary separating chamber is removed, the interior of the tank is practically free of obstructions and may be quickly inspected or easily cleaned.

This design can be operated either as an oil-gas separator where the prime consideration is the removal of gas from oil, or as a washer or scrubber where gas, air or vapor containing dust or foreign material can be washed by contact with the liquid, or can be bubbled through a liquid or solution for the purpose of cleansing or for chemical treatment, or gas be bubbled through a liquid for the purpose of absorption.

All connections can readily be reached from the ground. The vessel can, if desired, be mounted upon skids and become portable. No jinpoles or winches are required to raise and set the vessel in position. The design provides less weight and less bulk than conventional designs and therefore saves transportation and handling costs.

What I claim and desire to secure by Letters Patent is:

1. A vapor-liquid separator comprising a horizontally arranged elongated tank, a vapor-liquid inlet pipe connected to one end thereof, a liquid discharge pipe leading from the lower portion of said tank, and a vapor discharge pipe leading from the upper portion thereof, a conduit of considerably larger diameter than said inlet pipe, forming a primary separating chamber and extending longitudinally through the central portion of said tank and arranged to receive fluids discharged from said vapor-liquid inlet pipe, a wide downwardly directed port in said conduit extending throughout substantially the entire length of said conduit, the space in said tank between said conduit and the bottom of the tank being unobstructed, and a discharge manifold extending longitudinally across the upper portion of said tank above the conduit, communicating with said vapor discharge pipe, and having spaced openings substantially throughout its length for the passage of vapors therethrough.

2. A vapor-liquid separator comprising a horizontally arranged elongated tank, a vapor-liquid inlet pipe connected to one end thereof, a liquid discharge pipe leading from the lower portion of said tank, and a vapor discharge pipe leading from the upper portion thereof, a conduit of considerably larger diameter than said inlet pipe, forming a primary separating chamber and extending longitudinally through the central portion of said tank and arranged to receive fluids discharged from said vapor-liquid inlet pipe, a wide downwardly directed port in said conduit extending throughout substantially the entire length of said conduit, the space in said tank between said conduit and the bottom of the tank being unobstructed, and a substantially semi-cylindrical perforated discharge manifold extending horizontally across the upper portion of said tank and having upwardly directed side walls connected to said tank at opposite sides of said vapor discharge pipe.

3. A vapor-liquid separator comprising a horizontally arranged elongated tank, a vapor-liquid inlet pipe connected to one end thereof, a liquid discharge pipe leading from the lower portion of said tank, and a vapor discharge pipe leading from the upper portion thereof, a conduit of considerably larger diameter than said inlet pipe, forming a primary separating chamber and extending longitudinally through the central portion of said tank and arranged to receive fluids discharged from said vapor-liquid inlet pipe, a wide downwardly directed port in said conduit extending throughout substantially the entire length of said conduit, the space in said tank between said conduit and the bottom of the tank being unobstructed, a discharge manifold extending longitudinally across the upper portion of said tank above the conduit, communicating with said vapor discharge pipe and having spaced openings substantially throughout its length for the passage of vapors therethrough, and upwardly extending lips in said conduit positioned at opposite sides of said port for collecting liquid flowing along the inner surface of said conduit and causing it to discharge at the ends of the port into said tank.

4. A vapor-liquid separator comprising a horizontally arranged elongated tank, a vapor-liquid inlet pipe connected to one end thereof, a liquid discharge pipe leading from the lower portion of said tank, and a vapor discharge pipe leading from the upper portion thereof, a conduit of considerably larger diameter than said inlet pipe, forming a primary separating chamber and extending longitudinally through the central portion of said tank and arranged to receive fluids discharged from said vapor-liquid inlet pipe, a wide port in the bottom of said conduit extending throughout substantially the entire length of said conduit, the space in said tank between said conduit and the bottom of the tank being unobstructed, a substantially semi-cylindrical perforated discharge manifold extending horizontally across the upper portion of said tank and having upwardly directed side walls connected to said tank at opposite sides of said vapor discharge pipe, a down-spout connected to the bottom of the manifold, and a cup arranged at the lower end of said spout and cooperating with the latter to provide a liquid seal at the lower end of the spout.

RAYMOND B. MILLARD.